Aug. 1, 1967  S. L. BLACKMAN  3,334,342
THREE TERMINAL BRIDGED T NETWORK FOR MONITORING
THE OPERATING SPEED OF A MOTOR
Filed March 3, 1965

INVENTOR.
SANFORD L. BLACKMAN
BY Herbert L. Davis

ATTORNEY

United States Patent Office 3,334,342
Patented Aug. 1, 1967

3,334,342
THREE TERMINAL BRIDGED T NETWORK FOR MONITORING THE OPERATING SPEED OF A MOTOR
Sanford L. Blackman, Pompton Plains, N.J., assignor to The Bendix Corporation, Teterboro, N.J., a corporation of Delaware
Filed Mar. 3, 1965, Ser. No. 436,849
6 Claims. (Cl. 340—263)

ABSTRACT OF THE DISCLOSURE

A three terminal bridged T network to monitor the operating speed of a motor. The bridge network having a field winding of the motor in one arm thereof which is balanced at synchronous or maximum motor speed and which bridge network becomes unbalanced at nonsynchronous motor speeds due to a change in the effective impedance of the field winding which causes a corresponding output signal.

---

The invention relates to an improved three terminal bridged T network for monitoring the operating speed of a motor, and more particularly to improvements in the means for monitoring or effecting a test of the speed of an electric motor for driving the rotor of a gyroscope of the type described generally and claimed broadly in U.S. Patent No. 3,146,433, granted Aug. 25, 1964, to Charles E. Hurlburt and assigned to The Bendix Corporation.

Heretofore, as described in the U.S. Patent No. 3,146,433, instances of rotor bearing failure in gyroscopes have occurred, causing inaccuracies in the operation of the gyroscope. Moreover, such instances of bearing failure have occurred under flight conditions of the aircraft in which the pilot was using the gyroscope in overcast weather so that the precession of the gyroscope caused by a decelerating rotor due to such bearing failure resulted in the pilot maneuvering the aircraft into a hazardous condition. It is desirable, therefore, that a means be provided for warning the pilot that such a condition is imminent.

Experience in running lift tests on rotors of gyroscopes has shown that bearing failure is not characterized by sudden decelerations from a normal operating speed, but instead is evidenced by a gradual reduction in the running speed of the gyroscope rotor over a period of a few days up to a point where the bearings may become degraded to the extent where they seize, causing abnormal deceleration with resulting rapid precession of the gyroscope. A solution of the problem presented is to provide means to sense a reduced running speed of the electric motor driving the gyroscope rotor and to use this sensing means to effect an electrical signal for providing a warning of impending bearing failure.

Heretofore, in the use of electric motors operating at synchronous speeds or at little slip for driving a gyroscope rotor, it has been a requirement to have means available to determine that the rotational velocity thereof is as required. Thus, for example, many gyroscopes, for missile or aircraft use, require means for effecting a self-test of the gyroscope, including means for measuring the speed of rotation of the gyroscope rotor. In most instances, the rotor of the gyroscope is mounted in a sealed case and is not readily accessible.

As described and claimed in the U.S. Patent No. 3,146,433, means have been heretofore provided to sense the rotation of the gyroscope motor or rotor driven thereby so as to produce a monitor signal predicated on the basic concept that the impedance of the field windings of an electric motor operating at a speed in synchronism with or at a maximum speed relative to the rotational frequency of the alternating current supply is quite different from the impedance of the field windings of the motor when operating at a nonsynchronous speed or at a speed less than said maximum speed, even though the latter speed of the motor may differ by only a very slight value from the synchronous or maximum speed value.

The monitoring bridge, as disclosed in the Hurlburt U.S. Patent No. 3,146,433, is a four terminal network in which neither terminal of the bridge output monitor voltage may be connected in common with an input line voltage to operate the motor. Thus, in order to utilize such monitor signal voltage for operating an amplifier circuit with one terminal at case or ground potential would require the provision of an isolation transformer. The present invention overcomes this disadvantage in providing a three terminal monitoring bridge in which an output terminal of the bridge monitoring voltage is common to an input terminal of the line voltage which operates the motor.

An object of the present invention, therefore, is to provide a novel motor speed monitoring bridged T network to avoid the aforenoted disadvantages and a network in which first and second balancing arms may be noninductive and may be either a pair of capacitors or a resistor and capacitor so chosen as to provide a balanced bridge output null voltage signal upon operation of the motor at a predetermined maximum speed and an unbalanced bridge output monitor voltage signal in response to a change in the impedance of a motor field winding upon operation of the motor at less than a predetermined maximum speed, and in which the field winding provides a third and the sole inductive arm of the bridged T network.

Another object of the invention is to provide an improved three terminal monitoring bridge to sense operation of a two phase motor at less than a predetermined maximum speed in which an output terminal of the bridge monitor voltage and an input terminal of the line voltage to operate the two-phase motor may be connected in common at case or ground potential.

Another object of the invention is to provide a bridged T network to sense changes in the impedance of a field winding of a motor upon operation of the motor at less than a predetermined maximum motor speed.

Another object of the invention is to provide a novel bridged T network for monitoring the speed of a two-phase motor including a capacitor serving the double functions of (1) shifting or splitting the phase of an alternating or varying amplitude signal current for effecting a desired motor start and run performance and (2) the phase shifting capacitor provides one of the working arms of the bridged T network, together with a resistor element and auxiliary capacitor element which are serially connected across the phase splitting capacitor, with the auxiliary capacitor element and auxiliary motor winding providing the two other working arms of the bridged T network and with the resistor element and auxiliary capacitor element being so selected that the bridged T network provides a balanced bridge null voltage output when the motor is at a predetermined maximum speed, while upon the motor speed being less than said maximum speed, an output monitoring voltage is applied across a common grounded input-output lead from a conductor connecting the main and auxiliary field windings of the motor and a second output leading from a conductor connecting the resistor element and the auxiliary capacitor element.

Another object of the invention is to provide a novel bridged T network for monitoring the speed of a two-phase motor including a capacitor serving the double function of (1) shifting or splitting the phase of an alternating or varying amplitude signal current for effecting a desired motor start and run performance and (2) the phase shifting capacitor provides one of the working arms of the bridged T network, together with a resistor element and auxiliary capacitor element which are serially connected across the auxiliary field winding of the two-phase motor, with the resistor element and auxiliary motor winding providing the two other working arms of the bridged T network, with the resistor element and auxiliary capacitor element being so selected that the bridged T network provides a balanced bridge null voltage output when the motor is at a predetermined maximum speed, while upon the motor speed being less than said maximum speed, an output monitoring voltage is applied across a common grounded input-output lead from a conductor connecting the main field winding of the motor and the phase shifting capacitor and a second output leading from a conductor connecting the resistor element and the auxiliary capacitor element.

These and other objects and features of the invention are pointed out in the following description in terms of the embodiments thereof which are shown in the accompanying drawings. It is to be understood, however, that the drawing are for the purpose of illustration only and are not a definition of the limits of the invention. Reference is to be had to the appended claims for this purpose.

Figure 1:
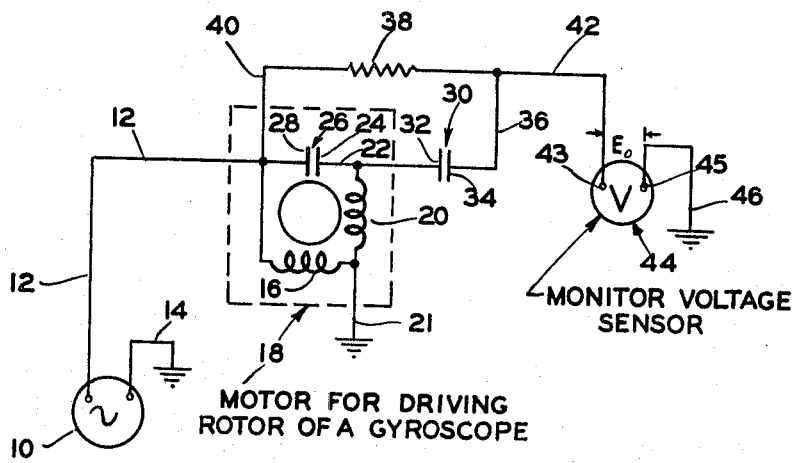
FIGURE 1 is a wiring diagram illustrating the novel bridged T monitor network of the present invention as applied to a conventional two-phase motor for driving the rotor of a gyroscope.

Referring to the drawing of FIGURE 1, there is indicated generally by the numeral 10 a suitable source of constant frequency amplitude varying or alternating current which is applied across an output conductor 12 and a grounded output conductor 14 to a main field winding 16 of a two-phase motor indicated generally by the numeral 18. The main winding 16 is connected at one end to the conductor 12 and at an opposite end to a grounded conductor 21. A second phase or auxiliary field winding 20 is connected at one end to the main winding 16 and the conductor 21 to the common ground. The opposite end of the auxiliary winding 20 is connected through a conductor 22 to a plate 24 of a phase shifting capacitor 26 having another plate 28 connected to the conductor 12. The two-phase motor 18, as thus described, may be of a conventional type and structure.

The auxiliary field winding 20 of the motor 18 provides one arm of a bridged T network including in a second arm thereof the phase splitting capacitor 26 and in a third arm an auxiliary capacitor 30. The auxiliary capacitor 30 has a plate 32 connected to conductor 22 and a second plate 34 connected by a conductor 36 to one end of a suitable resistor 38 having the opposite end connected by a conductor 40 to the output conductor 12.

A signal output conductor 42 leads from the conductor 36 to an input terminal 43 of a suitable monitoring means indicated schematically in FIGURE 1 as a suitable voltmeter 44 having an opposite input terminal 45 connected by a conductor 46 to a common ground. Thus, the common grounded input-output conductor 21 and the output conductor 42 of the bridged T network lead to the input terminals 43 and 45 of the voltmeter 44 of conventional type.

The input of the bridged T network is then applied across the conductor 12 and the common grounded input-output conductor 21, while the output from the bridged T network is applied through the grounded input-output conductor 21 and the conductor 42 to the voltmeter 44.

The resistor 38 and the auxiliary capacitor 30 are so selected that the bridged T network is balanced and the output across the grounded conductor 21 and the conductor 42 is at a null voltage when the motor 18 driving the gyroscope rotor is driven at predetermined maximum speed or synchronous speed relative to the rotational frequency of the amplitude varying or alternating current from supply 10 applied across the conductor 12 and the grounded conductor 21. The voltage then applied across the output lines 21 and 42 to the voltmeter 44 will then be null. However, when the speed of the motor 18 is reduced so as not to operate at a predetermined maximum speed or a speed in synchronism with the alternating or amplitude varying current from supply 10, the bridged T network becomes unbalanced due to a resulting change in the impedance of the motor winding 20, whereupon the electromotive force applied across the output conductors 21 and 42 reaches a finite value which will be sensed by the voltmeter 44 to give an indication to the operator of the reduced speed of operation of the motor 18 and that the motor 18 for driving the gyro rotor is not operating at said predetermined maximum speed or a speed in synchronism with the cyclic varying amplitude or alternating current applied across the lines 12 and 21 from the source 10.

The extent of this reduced speed will be indicated by the value of the voltage applied across the output lines 21 and 42 which will increase with the reduction in the speed of the motor 18 to effect a control function or operation of the voltmeter 44 so that it may be determined therefrom when a critical point in the condition of the rotor bearing has been reached.

Figure 2:
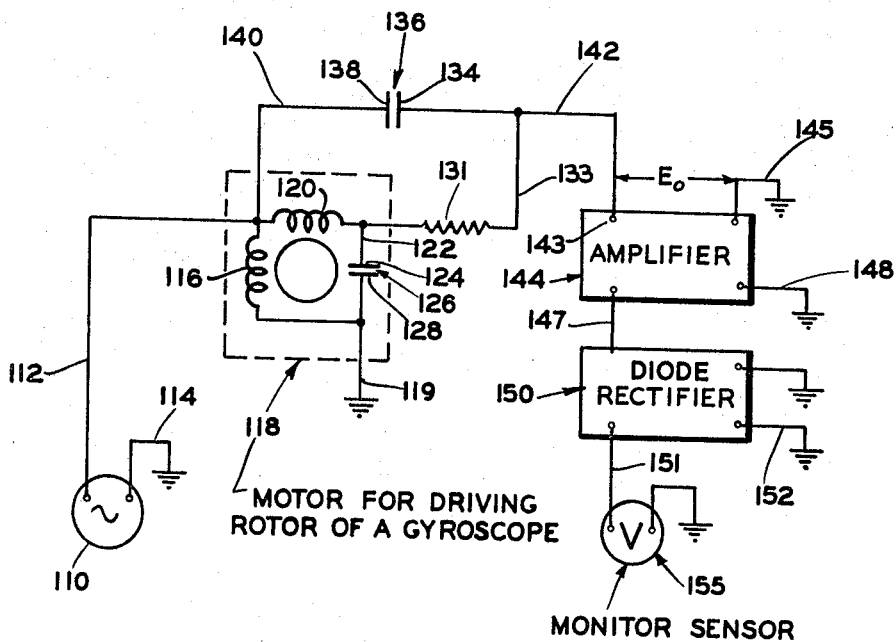
FIGURE 2 is a schematic wiring diagram illustrating a modified form of the novel bridged T monitor network of the present invention as applied to a conventional two-phase motor for driving the rotor of a gyroscope.

Referring now to the second form of the invention, shown in FIGURE 2, there is indicated generally by the numeral 110 a suitable source of constant frequency amplitude varying or alternating current which is applied across an output conductor 112 and a grounded output conductor 114 to a main field winding 116 of a two-phase motor indicated generally by the numeral 118. The main field winding 116 has one end connected to the conductor 112, while an opposite end of the winding 116 is connected to a common grounded input-output conductor 119. A second phase or auxiliary field winding 120 is connected to one end to the main winding 116 and through the conductor 112 to the signal source 110 of cyclic electrical energy or varying amplitude, while the opposite end of the auxiliary winding 120 is connected through a conductor 122 to a plate 124 of a phase shifting capacitor 126 having another plate 128 connected to the main winding 116 and through the conductor 119 to a common ground. The two-phase motor 118, as thus described, may be of a conventional type and structure.

The auxiliary field winding 120 of the motor 118 is connected in one arm of a bridged T network including as a second arm thereof the phase shifting capacitor 126, while a third arm of the bridged T network includes a resistor element 131 having one end connected to the conductor 122 and an opposite end connected by a conductor 133 to a plate 134 of an auxiliary capacitor 136 having an opposite plate 138 connected by a conductor 140 to the output conductor 112 leading from the source of current 110.

A monitoring signal output conductor 142 leads from the conductor 133 to an input terminal 143 of a suitable amplifier 144 having an opposite grounded input terminal 145 and output conductors 147 and 148 leading in turn to the input of a diode rectifier 150 having output conductors 151 and 152 leading to suitable low speed condition warning means such as a visual indicator, audible alarm or voltmeter 155. As shown, the input terminal 145 of the amplifier 144 may be connected to a common ground. Thus, the common grounded input-output conductor 119 and the output conductor 142 of the bridged T network lead to the input terminals 143 and 145 of the amplifier 144 for operating the motor speed monitor means 155.

It will be seen then that the input of the bridged T network is applied across the conductor 112 and the common grounded input-output conductor 119, while the output from the bridged T network is applied through the common grounded input-output conductor 119 and the conductor 142 to the monitor means or amplifier therefor 144.

The resistor element 131 and the auxiliary capacitor element 136 are so selected that the bridged T network is balanced so that the output across the grounded conductor 119 and the conductor 142 is at a null voltage when the motor 118 driving the gyroscope rotor is driven at a predetermined maximum speed or a synchronous speed relative to the rotational frequency of the signal from current supply 110 applied across the conductor 112 and the grounded input-output conductor 119.

However, when the speed of the motor 118 is reduced so as not to operate at a predetermined maximum speed or a speed in synchronism with the constant frequency and varying amplitude or alternating current from supply 110, the bridged T network becomes unbalanced due to a resulting change in the impedance of the auxiliary winding 120, whereupon the electromotive force applied across the output conductors 119 and 142 reaches a finite value which will be sensed through the amplifier 144 and rectifier 150 to effect a control function or operation of the condition responsive means or voltmeter 155 to give an indication to the operator of the reduced speed of operation of the motor 118 and that the motor 118 for driving the gyro rotor is not operating at said predetermined maximum speed or a speed in synchronism with the cyclic and varying amplitude or alternating current signal applied from the source 110.

The extent of this reduced speed will be indicated by the value of the voltage applied across the output lines 119 and 142 which will increase with the reduction in the speed of the motor 118, as indicated by the voltmeter 155 so that it may be determined therefrom when a critical point in the condition of the rotor bearing has been reached.

In both the form of the invention shown in FIGURE 1 and in FIGURE 2, the capacitor 26 and 126 serves a dual purpose of shifting or splitting the phase of the alternating or cyclic and varying amplitude current supplied from the source 10 or 110 so as to effect a desired motor start and run performance and, further, the capacitor 26 and 126, of FIGURES 1 and 2, provides one of the working arms of the bridged T network, while a second arm of the bridged T network is provided by the auxiliary field winding 20 of FIGURE 1 or the auxiliary field winding 120 in FIGURE 2. The resistor element and the auxiliary capacitor element (resistor 38 and capacitor 30 of FIGURE 1 and resistor 131 and capacitor 136 of FIGURE 2) are so selected that the output voltage $E_o$ is a null voltage when the motor 118 is driven at a predetermined maximum speed. Thereafter, any small percentage change or decrease in the rotational speed produces a large percentage change in the $E_o$ voltage.

The improved forms of the invention shown in FIGURES 1 and 2 feature the addition of only two new components to the conventional structure of the two-phase servo motor (18 in FIGURE 1 and 118 in FIGURE 2). These two new components are a resistor element and a capacitor element (in FIGURE 1, the resistor 38 and capacitor 30 and in FIGURE 2, the resistor 131 and the capacitor 136) which are inherently reliable in operation, light in weight, small in size, and low in cost. The present invention thus simplifies the monitoring system disclosed in the Hurlburt U.S. Patent No. 3,146,433 and avoids the disadvantage and expense of the heretofore required inductance in the balancing arm $Z_1$ of the bridge circuit shown in FIGURE 3 of the Hurlburt patent.

Moreover, as further distinguished from the monitor system described in the U.S. Patent No. 3,146,433, the present invention provides an arrangement having one terminal common to both the input line voltage for the gyro motor and the output signal voltage for the monitoring system (in FIGURE 1 indicated by numeral 21 and in FIGURE 2 indicated by numeral 119), and which arrangement does not require an isolation transformer to provide such a common input-output grounded terminal as would the arrangement disclosed in U.S. Patent No. 3,146,433.

Thus, there is provided in the present invention an improved three terminal bridged T network for monitoring the operating speed of an electric motor for driving the rotor of a gyroscope which provides greater simplicity in electrical parts than the arrangement of the Hurlburt U.S. Patent No. 3,146,433.

While two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. Means for monitoring the operating speed of an electric motor normally operating at a selected maximum speed relative to the frequency of an alternating current source, said motor being of a type including a main field winding, an auxiliary field winding in series with a phase shifting capacitor energized through a pair of input conductors leading from said alternating current source, one of said input conductors leading to a conductor connecting the auxiliary and main field windings, and another of said input conductors leading to a conductor connecting said main field winding and said phase shifting capacitor; said monitoring means comprising a bridged T network including said auxiliary field winding in a first arm thereof and said phase shifting capacitor in a second arm thereof, a resistor element and an auxiliary capacitor element serially connected across one of said arms of the bridged T network, the resistor element being connected to the phase shifting capacitor and the auxiliary capacitor being connected to the auxiliary winding, one of said serially connected elements providing a third arm of the bridged T network, a pair of signal output conductors extending from said bridged T network, one of said pair of output conductors leading from a conductor serially connecting said serially connected elements, and the other of said pair of output conductors being common to said input conductor connected to the main field winding and the arm of said bridged T network other than the one arm across which said resistor and auxiliary capacitor elements be serially connected, and electrical condition responsive means operatively connected to said pair of output conductors, said resistor element and capacitor element being so related to the first and second arms of the bridged T network that said network may be substantially balanced upon operation of said electric motor at said selected maximum speed, and upon the motor operating at a slower speed than said selected maximum speed, the impedance of the auxiliary field winding of said motor may be effectively changed so as to substantially unbalance the first arm of the bridged T network relative to the second and third arms thereof, whereupon the electrical condition responsive means becomes effective at said slower speed condition of the motor.

2. The combination defined by claim 1 in which the auxiliary capacitor element is connected in the bridged T network so as to provide the third arm thereof.

3. The combination defined by claim 1 in which the resistor element is connected in the bridged T network so as to provide the third arm thereof.

4. A device for monitoring speed of an electric motor normally operating within a first high speed range relative to a supply source of cyclic electrical energy of varying amplitude, said motor being of a type including a pair of field windings energized from said supply and a phase shifting capacitor for effecting the energization of one of said field windings from said supply, and said one field winding having an impedance varying with the speed of the motor; said monitoring device comprising a bridge network having three effective arms to substantially balance said bridge network at motor speeds within said first high speed range, said bridge network including as a first pair of arms said one field winding providing a first arm of the network and said phase shifting capacitor providing a second arm of the bridge network, a resistor element and a capacitor element serially connected across one of said arms, the resistor element being connected to the phase shifting capacitor and the capacitor element being connected to the one field winding and one of said serially connected elements providing third arm of the bridge network, input conductors for connecting said supply of electrical energy across said first pair of arms of the bridge network, output conductors leading from said serially connected elements providing third arm of the bridge network other than the one arm across which said resistor and capacitor elements be serially connected, said bridge network being effectively unbalanced by a variance in the impedance of said one field winding upon a change in the speed of the motor to within a second low speed range, and electrical condition responsive means operatively connected across said output conductors and rendered effective upon operation of the motor within the second low speed range.

5. A device for monitoring speed of an electric motor normally operating within a first high speed range relative to a supply source of cyclic electrical energy of varying amplitude, said motor being of a type including a pair of field windings energized from said supply and a phase shifting capacitor for effecting the energization of one of said field windings from said supply, and said one field winding having an impedance varying with the speed of the motor; said monitoring device comprising a bridge network having three effective arms to substantially balance said bridge network at motor speeds within said first high speed range, said one field winding providing a first arm of the network and said phase shifting capacitor providing a second arm of the bridge network, a resistor element and an auxiliary capacitor element serially connected across said phase shifting capacitor, said auxiliary capacitor element being connected between said resistor element and said phase shifting capacitor so that said auxiliary capacitor element provides a third arm of the bridge network, input conductors for connecting said supply of electrical energy across said first and second arms of the bridge network, output conductors leading from said first and third arms of the bridge network, said bridge network being effectively unbalanced by a variance in the impedance of said one field winding upon a change in the speed of the motor to within a second low speed range, and electrical condition responsive means operatively connected across said output conductors and rendered effective upon operation of the motor within the second low speed range.

6. A device for monitoring speed of an electric motor normally operating within a first high speed range relative to a supply source of cyclic electrical energy of varying amplitude, said motor being of a type including a pair of field windings energized from said supply and a phase shifting capacitor for effecting the energization of one of said field windings from said supply, and said one field winding having an impedance varying with the speed of the motor; said monitoring device comprising a bridge network having three effective arms to substantially balance said bridge network at motor speeds within said first high speed range, said one field winding providing a first arm of the network and said phase shifting capacitor providing a second arm of the bridge network, an auxiliary capacitor element and a resistor element serially connected across said one field winding, said resistor element being connected between said auxiliary capacitor and said one field winding so that said resistor element provides a third arm of the bridge network, input conductors for connecting said supply of electrical energy across said first and second arms of the bridge network, output conductors leading from said second and third arms of the bridge network said bridge network being effectively unbalanced by a variance in the impedance of said one field winding upon a change in the speed of the motor to within a second low speed range, and electrical condition responsive means operatively connected across said output conductors and rendered effective upon operation of the motor within the second low speed range.

References Cited
UNITED STATES PATENTS 3,146,433   8/1964   Hurlburt _____ 340—263

NEIL C. READ, *Primary Examiner.*

D. L. TRAFTON, *Assistant Examiner.*